United States Patent [19]

Gray

[11] 3,952,829

[45] Apr. 27, 1976

[54] VEHICLE SPEED CONTROL CIRCUIT

[75] Inventor: Larry O. Gray, Greensfork, Ind.

[73] Assignee: Dana Corporation, Toledo, Ohio

[22] Filed: May 22, 1975

[21] Appl. No.: 580,063

[52] U.S. Cl. .............................. 180/105 E; 123/102; 317/5
[51] Int. Cl.² .......................................... B60K 31/00
[58] Field of Search ........................ 180/105 E, 109; 123/102; 317/5; 318/603

[56] References Cited
UNITED STATES PATENTS

| | | | |
|---|---|---|---|
| 3,570,622 | 3/1971 | Wisner | 180/105 E |
| 3,715,006 | 2/1973 | Walsh | 180/105 E |
| 3,722,614 | 3/1973 | Sakakibara | 180/105 E |
| 3,766,367 | 10/1973 | Sumiyoshi | 123/102 X |
| 3,804,193 | 4/1974 | Ikuta | 180/105 E |
| 3,869,019 | 3/1975 | Cardani | 180/105 E |
| 3,891,046 | 6/1975 | Oicles | 180/105 E |

Primary Examiner—M. H. Wood, Jr.
Assistant Examiner—Terrance L. Siemens
Attorney, Agent, or Firm—William J. Clemens

[57] ABSTRACT

An apparatus for automatically maintaining the speed of a vehicle at a desired road speed as selected by the vehicle operator. When the operator actuates the control circuit, a desired road speed signal proportional to the vehicle road speed at that moment is generated and stored. The stored desired road speed signal is continuously compared with a signal representing the vehicle road speed to generate a duty cycle modulated control signal to a throttle control which adjusts the vehicle throttle to maintain the desired road speed. The generation of the desired road speed signal is synchronized with the vehicle road speed signal to provide an accurate and highly repeatable desired road speed signal. The control circuit also includes an anticipatory control which responds to the operator actuation of the control circuit to pre-position the throttle control as the desired road speed signal is being generated and stored. This reduces the overall response time of the speed control circuit.

11 Claims, 5 Drawing Figures

VEHICLE SPEED CONTROL CIRCUIT

BACKGROUND OF THE INVENTION

1. Field of the Invention

This invention relates in general to a vehicle speed control apparatus and in particular to an automatic speed control circuit which adjusts the vehicle throttle in response to a comparison of the vehicle road speed with a vehicle operator selected desired road speed.

2. Description of the Prior Art

Early devices for controlling the speed of a vehicle were mechanical controls having a large number of interrelated moving parts. These devices were usually complex and therefore expensive to manufacture and difficult to maintain in an accurate operating condition. Furthermore, since they were linked to the vehicle throttle, there were normally positioned in the engine compartment proximate the throttle linkage. This positioning posed problems where they were driven from the speedometer cable which then had to be brought into the engine compartment before being attached to the speedometer head in the instrument panel.

The problems associated with the mechanical speed control devices were overcome by the use of an electrical control device. At a comparable cost, the electrical device could be made more accurate and more reliable than the mechanical device. Furthermore, it could also be positioned proximate the throttle linkage without disturbing the speedometer cable since it only required an electrical connection to the speedometer head or cable to pick up the vehicle road speed. However, the electrical control had some associated problems.

If the reference road speed and/or the actual vehicle road speed signals were generated by the charging of a capacitor to a voltage potential proportional to the speed, inaccuracies were introduced due to leakage or deterioration over long periods of time. Furthermore, a relatively large capacitor was required to store a sufficient amount of charge and therefore the system package was relatively large. Another problem involved the use of a dial type control for setting in the reference road speed. These controls presented a safety hazard since the driver's attention was diverted from the road.

U.S. Pat. No. 3,715,006, issued Feb. 6, 1973 to William J. Walsh et al., discloses an automatic electrical speed control apparatus which eliminates the above mentioned capacitor and dial type control. The apparatus includes an A.C. source for generating a signal having a frequency proportional to the vehicle road speed. A frequency to voltage converter converts the speed signal to a D.C. voltage road speed signal having an amplitude proportional to the instantaneous road speed. A free-running pulse source for supplying pulses of a fixed amplitude and frequency is connected through a gate to a counter which accumulates the pulses in a memory. The count is converted to a D.C. voltage count signal having an amplitude proportional to the number of pulses counted. The gate is opened when a set switch is actuated by the operator and is closed when the D.C. road speed signal is equal to the D.C. count signal as detected by a comparator. The total count therefore is proportional to the reference road speed.

The D.C. road speed signal and the D.C. count signal are also the inputs to a differential amplifier which generates an output signal which varies with the changes in the relationship between the D.C. road speed signal and the D.C. count signal. A pulse width modulator responds to the differential amplifier output signal by generating a constant frequency signal having a duty cycle proportional to the output signal. The modulated signal is utilized to control a valve driver which in turn drives a solenoid connected to the throttle linkage to adjust the vehicle road speed. A low speed inhibit circuit prevents actuation of the solenoid below a minimum speed, typically 25 miles per hour.

The Walsh et al. speed control apparatus utilizes a resistor-capacitor filter in its frequency to voltage converter which either may react too slowly to changes in the road speed or may pass a ripple voltage at the tach generator frequency to cause an inaccurate reference road speed signal. Furthermore, since the solenoid of this speed control apparatus is not actuated until the set switch is released, the speed control apparatus may allow the vehicle to lose speed until the solenoid "catches up".

SUMMARY OF THE INVENTION

The present invention concerns an automatic speed control circuit for maintaining the speed of a vehicle at a desired road speed. The circuit receives a pulsed input signal having a frequency proportional to the vehicle road speed from a speed sensor. A frequency to voltage converter converts the pulsed signal to a waveform having a D.C. base voltage with a magnitude proportional to the vehicle road speed capped by a triangular waveform having a frequency proportional to and an amplitude inversely proportional to the vehicle road speed. A control comparator responds to the difference between this waveform and a D.C. voltage with a magnitude proportional to the desired road speed to generate a duty cycle modulated control signal. The control signal actuates a throttle control which adjusts the vehicle throttle to maintain the vehicle at the desired road speed.

The control circuit is actuated by the vehicle operator when the vehicle reaches the desired road speed. The generation of the desired road speed signal is initiated by the leading edge of the first vehicle road speed pulse to occur after the circuit is actuated. An oscillator is started to generate a pulse train to a binary counter which accumulates a count representing the total number of pulses generated. A digital to analog converter converts the counter binary output to a D.C. voltage having a magnitude proportional to the count total. This signal is applied to one input of a speed comparator. The same vehicle speed pulse is passed through a filter to generate a positive going slope of a triangular waveform having an average magnitude proportional to the vehicle road speed which is applied to the other input of the speed comparator. When the input signals are equal, the speed comparator turns off the oscillator and the converter output voltage represents the desired road speed signal which is supplied to the control comparator. The synchronization of the speed comparator input signals ensures that coincidence will occur at the same point on the positive going slope for a given desired road speed each time the control is actuated. Therefore, the control circuit will be highly accurate in setting and maintaining the desired road speed throughout its control range.

The present invention also includes a low speed switch and a throttle set up timer. The low speed switch is effective to sense a vehicle road speed less than a predetermined minimum and block the control comparator output signal from reaching the throttle control. This prevents the speed control apparatus from engaging the throttle at low speeds, typically below thirty miles per hour. The throttle set up timer is an anticipatory control effective upon the actuation of the set point switch to remove the vehicle road speed signal from the control comparator. The control comparator will respond by increasing the duty cycle to cause the throttle control to advance the throttle setting. When the magnitude of the desired road speed signal from the digital to analog converter equals the magnitude of the vehicle road speed signal, the throttle set up timer will be turned off and the control comparator will generate the duty cycle modulated output signal to the throttle control to finish advancing the throttle setting to obtain the desired road speed. Thus, the throttle set up timer anticipates the need to advance the throttle setting and pre-position the throttle control to reduce the response time of the speed control apparatus.

It is an object of the present invention to provide a speed control circuit which will automatically maintain the vehicle road speed at an operator selected desired road speed.

It is another object of the present invention to provide a speed control circuit which cannot be engaged for control of the vehicle below a predetermined minimum speed.

It is a further object of the present invention to provide a speed control circuit which responds to a request for automatic control by anticipatorially pre-positioning the throttle control to reduce the system response time.

It is another object of the present invention to provide a speed control circuit which synchronizes the generation of the desired road speed signal with the vehicle road speed to produce an accurate and highly repeatable desired road speed signal for more accurate speed control.

DESCRIPTION OF THE PREFERRED EMBODIMENT

Figure 1:
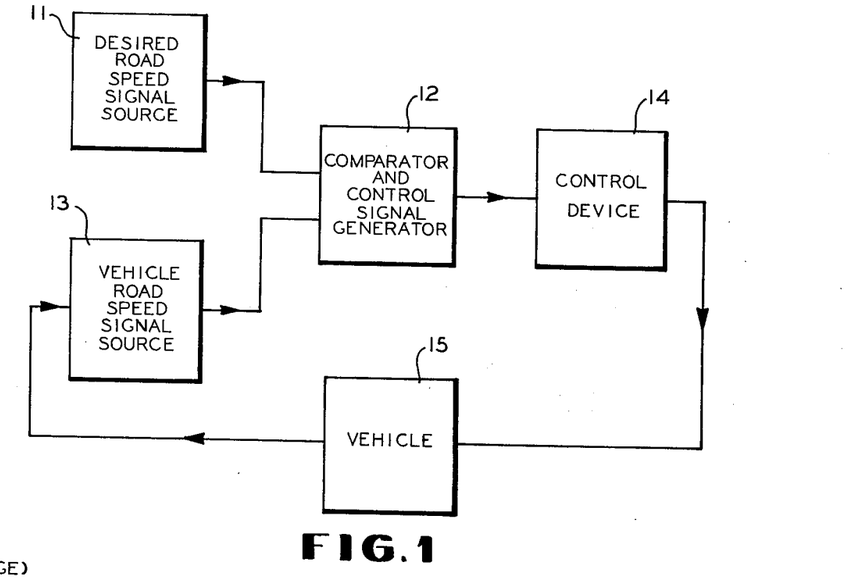
FIG. 1 is a block diagram of a vehicle speed control system utilizing a speed control circuit according to the present invention.

Referring to FIG. 1, there is shown a block diagram of a vehicle speed control system including a control circuit according to the present invention. This system can be utilized to automatically control the road speed of a vehicle at an operator selected desired road speed. A desired road speed signal is generated by a signal source 11 as one input signal to a comparator and control signal generator 12. The desired road speed signal is a direct current voltage having a magnitude proportional to the road speed selected by the operator. A vehicle road speed signal source 13 senses the rotational velocity of an element of the vehicle which is rotating at a speed proportional to the vehicle road speed and generates a vehicle road speed signal as the other input to the comparator and control signal generator 12. The waveform of the vehicle road speed signal is a D.C. base voltage having a magnitude proportional to the vehicle road speed capped by a triangular waveform having a frequency proportional to and a peak amplitude inversely proportional to the vehicle road speed.

The comparator and control signal generator responds to the difference between the two input signals by generating a duty cycle modulated control signal having a duty cycle proportional to the difference between the two input signals. A control device 14 adjusts a throttle of the vehicle 15 in accordance with the control signal to set the vehicle road speed equal to the desired road speed. If the road speed of the vehicle 15 changes due to a change in the loading on its prime mover, the change will be sensed by the vehicle road speed signal source 13 which then modifies its output signal. The comparator and control signal generator will respond to the modified output signal of the road speed signal source by changing the duty cycle of the control signal to adjust the throttle in a direction to drive the vehicle road speed back to the desired road speed.

Figure 2:
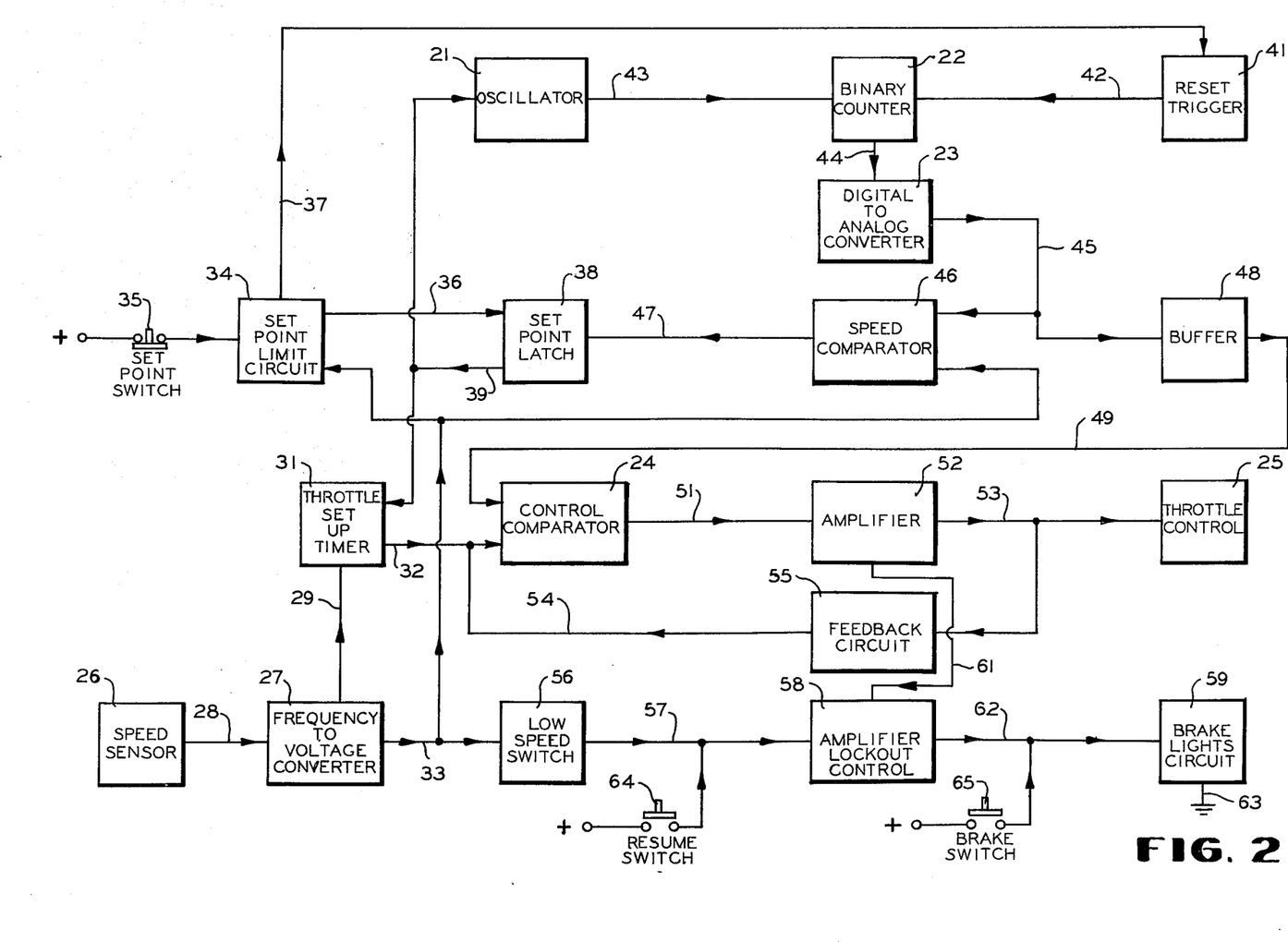
FIG. 2 is a more detailed block diagram of the speed control circuit of FIG. 1.

Referring to FIG. 2, there is shown a more detailed block diagram of the speed control circuit according to the present invention. The desired road speed signal source 11 of FIG. 1 is represented by an oscillator 21, a binary counter 22 and a digital to analog converter 23. The comparator and control signal generator 12 is represented by a control comparator 24. The control device 14 is represented by a throttle control 25 and the vehicle road speed signal source 13 is represented by a speed sensor 26 and a frequency to voltage converter 27.

The speed sensor 26 detects the rotational velocity of an element of the vehicle which is moving at a speed proportional to the road speed of the vehicle. The speed sensor 26 generates a pulsed output signal having a frequency proportional to the instantaneous road speed of the vehicle on an output line 28. The frequency to voltage converter 27 converts the pulsed output signal into a direct current voltage capped with a triangular waveform having an amplitude proportional to the instantaneous road speed. This actual road speed D.C. voltage signal with the triangular cap appears on a line 29, passes through a throttle set up timer 31, and is applied on a line 32 to one input of the control comparator 24. The other input of the control comparator 24 receives a desired road speed signal which is compared with the actual road speed signal to generate a duty cycle modulated control signal to the throttle control 25. The throttle control 25 responds to the control signal by adjusting the vehicle throttle to attain the desired road speed.

The frequency to voltage converter 27 also generates, on a line 33, a pulsed signal having a frequency and duty cycle proportional to the instantaneous road speed. This signal is applied to one input of a set point limit circuit 34. When a normally closed set point switch 35 is actuated by the vehicle operator, a positive polarity D.C. voltage is removed from the other input of the set point limit circuit 34 to indicate that it is desired to maintain the present road speed of the vehicle. After the actuation of the set point switch 35 and simultaneously with the leading edge of the next occurring output pulse on the line 33, the set point limit circuit 34 generates a set signal on a line 36 and a reset signal on a line 37. A set point latch 38 responds to the set signal on the line 36 by generating an output signal on a line 39 to turn on the throttle set up timer 31 and the oscillator 21. A reset trigger 41 responds to the reset signal on the line 37 by generating a reset signal on a line 42 to the binary counter 22 to clear the memory of the counter to zero before the oscillator 21 turns on.

When the oscillator 21 turns on, it generates output pulses at a constant predetermined frequency which is much higher than the highest frequency generated by the speed sensor 26. These output pulses are sent on a line 43 to the binary counter 22 where they are accumulated as a binary number. The binary counter generates the accumulated count as a binary coded signal on a line 44 to a digital to analog converter 23. The converter 23 changes the binary coded signal to a D.C. voltage having an amplitude proportional to the accumulated count in the binary counter 22. The D.C. voltage is generated on a line 45 to one input of a speed comparator 46.

The other input of the speed comparator 46 receives the pulsed signal from the frequency to voltage converter on a line 33 which is filtered through a capacitor (not shown) to a D.C. voltage capped by a triangular waveform with a rising edge initiated at the leading edge of each pulse and an amplitude proportional to the actual road speed. The speed comparator 46 generates an output signal on a line 47 which is determined by the difference between the signals applied at its outputs. When the output signal on the line 47 is zero, signifying the magnitudes of the input signals coincide, the set point latch 38 will respond by resetting and removing the output signal from the line 39 to turn off the oscillator 21 thereby stopping the accumulation of counts by the binary counter 22. The synchronization of the two input signals ensures that coincidence occurs at the same point on the triangular waveform each time a particular desired speed is set.

The D.C. voltage output signal on the line 45 also is an input to a buffer 48 which generates the desired road speed signal on a line 49 to the other input of the control comparator 24. The control comparator 24 generates a control signal on a line 51 which has a duty cycle proportional to the difference between the actual road speed signal and the desired road speed signal. The control signal on the line 51 is inverted and amplified by an amplifier 52 to a level on an output line 53 which will actuate the throttle control 25. The throttle control will respond to the inverted and amplified control signal by adjusting the vehicle road speed such that the actual road speed equals the desired road speed. A selected portion of the amplified control signal on the line 53 is generated on a line 54 by a feedback circuit 55. The feedback signal is combined with the actual road speed signal on the line 32 as negative feedback to control the magnitude of the throttle movement.

The pulsed output signal on the line 33 from the frequency to voltage converter 27 is also applied to the input of a low speed switch 56 through a filter capacitor (not shown). The low speed switch 56 detects when the average D.C. voltage level of the pulsed output signal on the line 33 falls below a predetermined amplitude indicating that the vehicle speed is less than a minimum value, typically 30 miles per hour. When the low speed is detected, the low speed switch 56 generates a signal on a line 57 to an amplifier lockout control 58. The amplifier 52 only generates the control signal on the line 53 when it is connected to the system ground through a brake lights circuit 59. When the vehicle speed is greater than the minimum value, the amplifier 52, as will be discussed below, may be connected to ground through the amplifier lockout control 58. The amplifier 52 is connected to one side of a closed switch in the amplifier control 58 by a line 61. The other side of the switch is connected by a line 62 through the brake lights circuit 59 to a ground line 63. When the vehicle speed falls below the minimum value, the low speed switch 56 signals the amplifier lockout control 58 to open the switch causing the amplifier 52 to remove the control signal from the line 53.

A normally open resume switch 64 is connected between a positive polarity power supply (not shown) and the line 57. After the vehicle speed increases above the minimum value, the amplifier 52 may be activated to resume the speed control function. When the resume switch 64 is actuated by the vehicle operator, the amplifier lockout control 58 responds to the positive polarity voltage by closing its switch and connecting the amplifier 52 to the ground line 63. The amplifier 52 then generates the control signal on the line 53 to the throttle control 25 to control the vehicle speed in accordance with the desired speed value stored in the binary counter 22.

A normally open brake switch 65 is connected between a positive polarity power supply (not shown) and the line 62. When the brake switch 65 is actuated by the vehicle operator, the positive polarity voltage will cause the switch in the amplifier lockout control 58 to open. The amplifier 52 will remove the control signal from the line 53 to place the vehicle throttle under manual control. The automatic control may only be resumed if the resume switch 64 or the set point switch 35 is actuated and the vehicle speed is above the minimum value.

In summary, the vehicle speed control apparatus shown in FIG. 2 automatically controls the speed of a vehicle at a desired value of road speed. The actual road speed of the vehicle is detected by the speed sensor 26 and is supplied to one input of the speed comparator 46. When the vehicle reaches the desired speed, the operator actuates the set point switch 35 to cause the binary counter 22 to count pulses in a pulse train of a predetermined frequency generated by the oscillator 21. The output of the binary counter 22 is converted to a D.C. voltage by a digital to analog converter 23 to supply a desired speed signal to the other input of the speed comparator 46. When the desired speed signal equals the actual road speed signal in magnitude, the speed comparator turns off the oscillator 21 and the count stored in the binary counter generates the desired speed signal to one input of the control comparator 24. The other input of the control comparator 24 receives the actual road speed signal so that the control comparator generates a control signal which has a duty cycle proportional to the difference between the two input signals. This control signal is inverted and applied to the throttle control 25 which adjusts the vehicle road speed to the desired road speed thereby automatically controlling the vehicle road speed.

Figure 3:
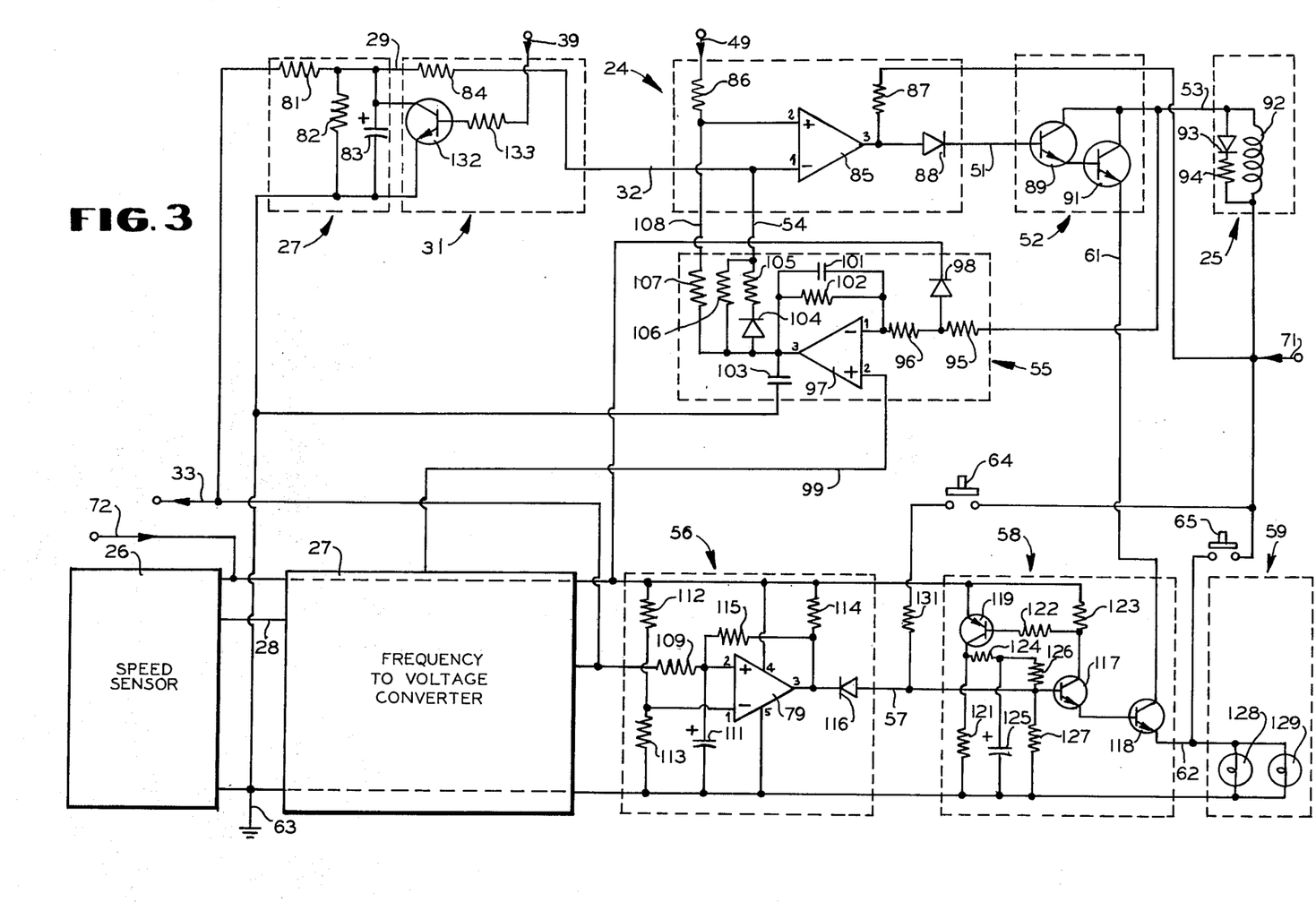
FIGS. 3 and 4 are schematic circuit diagrams of the speed control circuit shown in FIG. 2.
Figure 4:
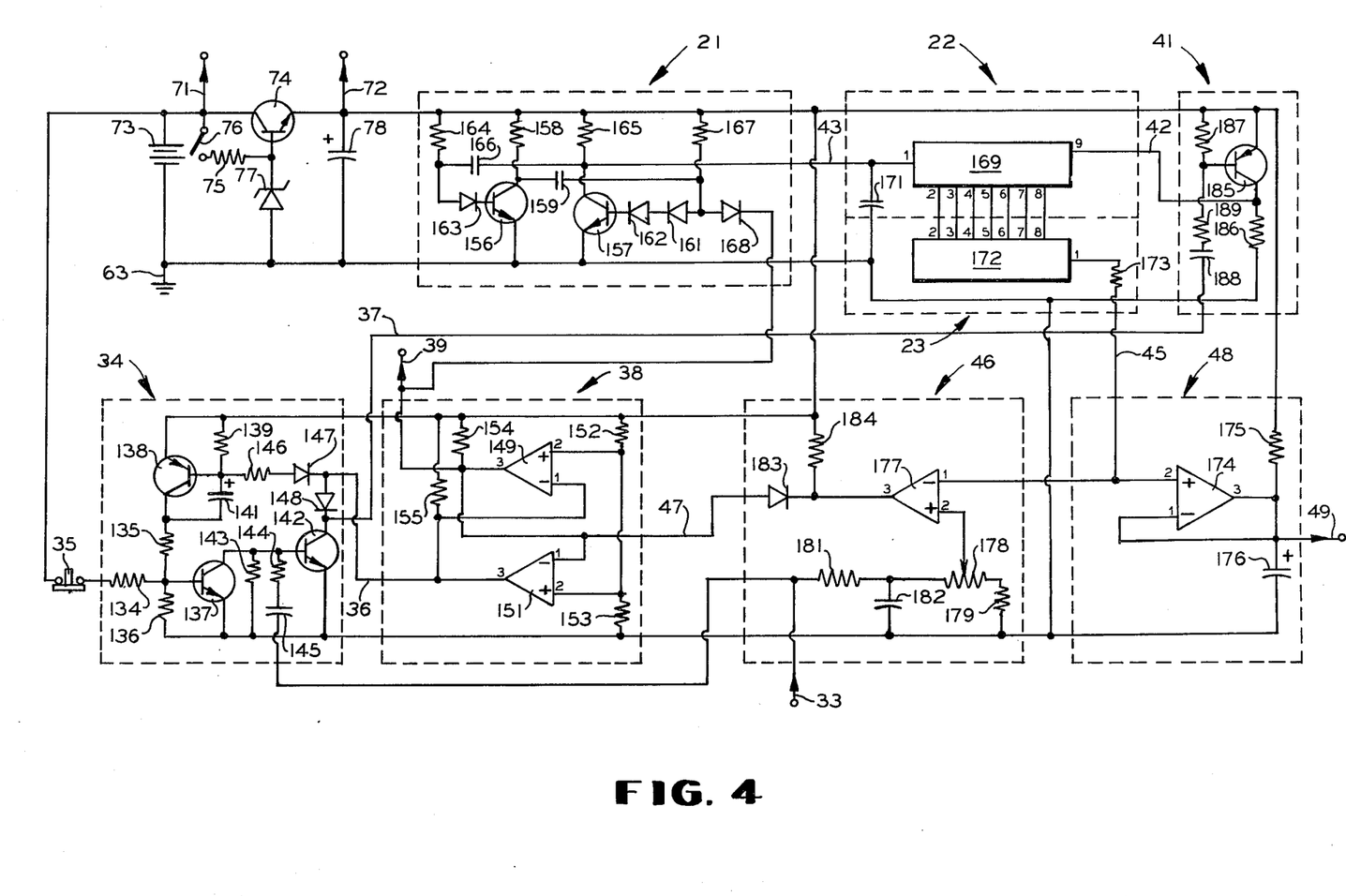

Referring to FIGS. 3 and 4 there is shown a schematic circuit diagram of the vehicle speed control apparatus of FIG. 1. Inputs to FIG. 3 from FIG. 4 are the output signal on the line 39 from the set point latch 38, the desired road speed signal on the line 49 from the buffer 48, unregulated D.C. power on a line 71 and regulated D.C. power on a line 72. An input to FIG. 4 from FIG. 3 is the pulsed road speed signal on the line 33 from the frequency to voltage converter 27.

The vehicle speed control circuit is supplied with both unregulated and regulated D.C. power from a battery 73, of FIG. 4, typically the battery utilized in the vehicle electric system. A positive polarity terminal of the battery 73 is connected to the unregulated D.C. power line 71 and a negative polarity terminal of the battery is connected to the ground line 63. In most instances, the ground line 63 will not be a single line, but rather will include conductive portions of the vehicle which provide return paths to the battery from the various electrical circuits.

The positive polarity terminal of the battery 73 is also connected to a collector of a NPN transistor 74 which has an emitter connected to the regulated D.C. power line 72 to function as an emitter follower. A base of the transistor 74 is connected to the positive polarity terminal of the battery 73 by a resistor 75 connected in series with a normally open switch 76. The base is also connected to the ground line 63 through a zener diode 77 which determines the base voltage and therefore the emitter voltage. Typically, the switch 76 may be the ignition switch of the vehicle which is closed when the vehicle is running. The battery 73 supplies a base biasing current through the closed switch 76 and the current limiting resistor 75. The zener diode 77 determines the base voltage and therefore the biasing voltage to define the regulated D.C. voltage and the amount of current passing through the transistor 74 from the battery to the regulated D.C. power line 72. When the voltage level on the line 72 is at or above the voltage at the base, the transistor will turn off to prevent current flow and lower the average voltage. When the voltage level on the line 72 is lower than the voltage at the base, the transistor will turn on to allow current flow and raise the average voltage. Typically, this circuit will regulate current from a twelve volt battery at approximately 8 volts D.C. on the regulated D.C. power line 72. A capacitor 78 is connected between the line 72 and the ground line 63 to filter any ripple generated by the switching of the transistor 74 and smooths the output voltage.

Figure 5:
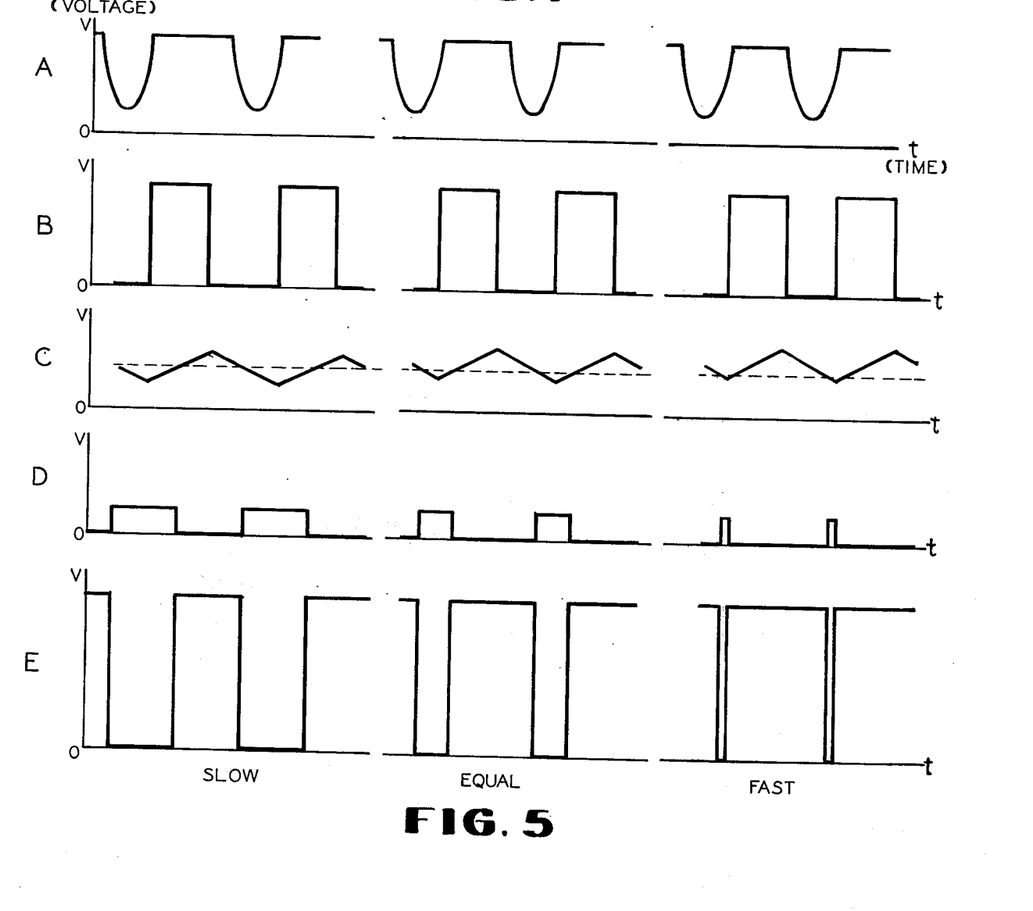
FIG. 5 is a waveform diagram of the various signals generated in the speed control circuit of FIGS. 3 and 4.

As shown in FIG. 3, the speed sensor 26 is connected to the power supply of FIG. 4 by the power line 72 and the ground line 63. The speed sensor generates a pulse train having a frequency proportional to the vehicle road speed on the output line 28 to the frequency to voltage converter 27. Any suitable speed sensor and voltage converter may be utilized such as the ones disclosed in the co-pending U.S. patent application entitled "VEHICLE ROAD SPEED SIGNAL SOURCE", Ser. No. 592,373, filed July 2, 1975, and assigned to the assignee of the present invention FIG. 5 shows the various waveforms generated in the circuits of FIGS. 3 and 4. A typical pulse train generated by the speed sensor 26 on the line 28 is shown as waveform A.

The pulsed output signal on the line 28 from the speed sensor 26 is an input to a portion of the frequency to voltage converter 27. The converter 27 generates a square wave signal having a frequency equal to and a duty cycle proportional to the frequency of the signal on the line 28. The output signal from the voltage to frequency on the line 33 therefore has average magnitude proportional to the vehicle road speed. A typical output signal from the converter 27 is shown as waveform B of FIG. 5.

In FIGS. 3 and 4, various elements may have their terminals designated by a reference numeral followed by a hyphen and a terminal identication numeral. Therefore, the inverting input of the amplifier 79 may be designated as 79-1, the non-inverting input may be designated as 79-2 and the output may be designated as 79-3. The amplifer 79 is a high gain operational amplifier which functions as a voltage comparator to generate an output signal proportional to the difference between the signals at its inputs limited to a maximum at the potential connected to the terminal 79-4 and to a minimum at the potential connected to the terminal 79-5. Since the terminal 79-4 is connected to the power line 72 and the terminal 79-5 is connected to the ground line 63, the output signal of the amplifier 79 will be limited between the regulated D.C. power line potential and the ground potential. Although not shown, each of the operational amplifiers in FIGS. 3 and 4 is connected in a manner to the amplifier 79. Each of the amplifiers may also have a resistor connected between its output and the power line 72. The resistor provides a current path when the load demands more current than the amplifier can supply without degrading its output signal.

A pair of resistors 81 and 82 are included in the other portion of the frequency to voltage converter 27 and are connected in series between the ground line 63 and the line 33 to form a voltage divider. A capacitor 83 is connected in parallel with the resistor 82 and is charged to a D.C. voltage determined by the voltage drop across the resistor 82 and the average D.C. voltage of the speed proportional signal on the line 33. The line 29 connects the junction of the resistors 81 and 82 and the capacitor 83 to the throttle set up timer 31. The D.C. voltage across the capacitor 83, which includes a triangular waveform due to the duty cycle signal on the line 33, passes through a current limiting resistor 84 to the line 32 which is connected to an input of an amplifier in the control comparator 24. The magnitude of the D.C. signal on the line 32 is proportional to the vehicle road speed while the triangular cap has a frequency proportional to and a magnitude inversely proportional to the vehicle road speed.

The control comparator 24 generates a control signal which has a duty cycle determined by the difference between the magnitudes of the signal on the line 32 and the desired road speed signal on the line 49. The control signal is generated on the line 51 and is amplified by the amplifier 52. The amplified signal is sent to the throttle control 25 on a line 53 to automatically control the position of the throttle and thereby control the vehicle road speed.

The signal on the line 32, shown as waveform C of FIG. 5, is applied to an inverting input 85-1 of an amplifier 85. A non-inverting input 85-2 is connected to the line 49 through a resistor 86 and receives the desired road speed signal shown as a dashed line on waveform C of FIG. 5. The amplifier 85 is a high gain operational amplifier similar to the amplifier 79 and will generate the waveform D of FIG. 5 at an output 85-3. The control signal will be at a maximum potential when the magnitude of the signal at the input 85-2 is greater than the magnitude of the signal at the input 85-1 and will be near ground potential when the magnitude of the signal at the input 85-1 is greater than the magnitude of the signal at the input 85-2. Therefore, the duty cycle of the control signal, shown as waveform D, will be proportional to the amount by which the signal at the input 85-1 exceeds the reference siignal at the input 85-2.

The waveforms A through D in the column designated "EQUAL" are those generated when the vehicle road speed is being maintained at the desired road speed. The duty cycle of the control signal, shown as waveform D, is, proportional to the vehicle throttle setting for the desired speed. If the vehicle road speed falls, shown as waveforms A through D in the "SLOW" column, the road speed signal on the line 32 falls and the control signal duty cycle will be increased to advance the vehicle throttle. If the vehicle road speed rises, shown as waveforms A through D in the "FAST" column, the control signal duty cycle will be decreased to retard the vehicle throttle.

The output 85-3 of the amplifier 85 is connected to the unregulated D.C. power line 71 through a resistor 87 to provide a source of current for the line 51. The output 85-3 is connected to an anode of a diode 88 which has a cathode connected to the line 51. The diode 88 passes the positive polarity portions of the control signal onto the line 51.

The control signal on the line 51 is inverted and amplified by the amplifier 52 on the line 53. The amplifier 52 includes a pair of NPN transistors 89 and 91 connected in a Darlington configuration for high current gain. Each of the transistors has a collector connected to the line 53 which in turn is connected to the power line 71 through the throttle control 25. A base of the transistor 89 is connected to the line 51 and an emitter is connected to a base of the transistor 91. An emitter of the transistor 91 is connected to the line 61 and the line 53 is connected through a solenoid coil 92 in the throttle control 25 to the power line 71. If the line 61 is connected to the ground line 63 through the amplifier lockout control 58 and the brake lights circuit 59, the transistors 89 and 91 will be turned on to allow current flow through the coil 92 during the presence of the positive polarity voltage pulse, shown in the waveform D of FIG. 5, on the line 51. During the time between the pulses, the transistors 89 and 91 will be turned off to prevent current flow through the coil 92. Therefore, the coil is duty cycle modulated to actuate the throttle linkage. The voltage on the line 51 has been inverted and amplified on the line 53 shown as the waveform E of FIG. 5. A diode 93 has an anode connected to the line 53 and a cathode connected to a resistor 95 which in turn is connected to the line 71 to provide a current flow path and limit to a safe level the voltage spike generated by the collapsing field of the coil 92 when the transistors 89 and 91 are turned off.

If the throttle control 25 is connected so as to advance the vehicle throttle when current is flowing in the solenoid coil and retard the vehicle throttle when no current is flowing in the solenoid coil, then the throttle setting will be proportional to the duty cycle of the control signal. Typically, the solenoid coil 92 controls a valve between the vehicle engine manifold and a bellows. The bellows is attached to the throttle linkage and may be fully extended by a spring to close the throttle when the interior of the bellows is at atmospheric pressure. When the valve is opened, a vacuum will be created inside the bellows allowing it to partially collapse in a direction to advance the throttle. When the valve is closed, the manifold vacuum is blocked and the bellows is connected to atmospheric pressure which allows the spring to extend the bellows and close the throttle. The solenoid coil and the valve are duty cycle modulated to determine the degree of vacuum in the bellows and therefore the degree of advance of the throttle.

The power gain of the vehicle throttle is lower at high speeds than at low speeds. As was previously stated, the magnitude of the triangular waveform on the line 32, shown as the waveform C of FIG. 5, is inversely proportional to the vehicle road speed. Therefore, at higher speeds, the difference between the speeds at which the control signal duty cycle goes to 0 and 100 percent will be less than the difference at low speeds. This automatically compensates for the variation in the power gain of the vehicle throttle to produce a substantially linear system.

The duty cycle modulated output signal on the line 53 is an input to the feedback circuit 55 which returns a portion of the output signal to the control comparator 24. The feedback circuit 55 provides a negative feedback signal having a magnitude proportional to the duty cycle of the control signal on the line 51 to reduce the gain of the amplifier 85. A pair of resistors 95 and 96 are connected in series between an inverting input 97-1 of an amplifier 97 and the line 53. An anode of a diode 98 is connected to the junction of the resistors 95 and 96 and has a cathode connected to the power line 72. The resistor 95 and the diode 98 co-operate to limit the signal at the junction to a maximum of approximately 8.7 volts D.C. irrespective of any changes in the magnitude of the D.C. voltage on the power line 71. The resistor 96 limits the current flow into the input 97-1. A non-inverting input 97-2 is supplied with a reference voltage from the frequency to voltage converter 27 on a line 99.

A capacitor 101 and a resistor 102 are connected in parallel between the input 97-1 and an output 97-3 such that the amplifier 97 functions as a low pass filter, filtering the difference between the two input signals. A capacitor 103 is connected between the output 97-3 and the ground line 63 to stabilize the amplifier. A diode 104 has an anode connected to the output 97-3 and a cathode connected to a resistor 105. A resistor 106 is connected in parallel with the series connected diode 104 and resistor 105 to form a current summing network with the resistor 84. The line 54 is connected to the inverting input 85-1 of the amplifier 85 in the control comparator 24. A resistor 107 is connected to the non-inverting input 85-2 by a line 108 and to the output 97-3 to supply a relatively small portion of the feedback signal to the input 85-2.

At vehicle speeds lower than the set point, the frequency of the amplified control signal will be lower while the duty cycle is higher than at higher speeds. When the lower speed amplified control signal at the input 97-1 is compared with the reference voltage at the input 97-2, it may be seen that the amplified control signal exceeds the reference voltage in magnitude a relatively shorter period of time than it does at higher speeds. Therefore, the filtered output 97-3 of the amplifier will be near the maximum potential which raises the voltage level at the input 85-1 and provides negative feedback on the line 54. As the vehicle road speed is increased, the feedback signal will fall in magnitude thereby keeping the road speed signal on the line 32 near the reference voltage on the line 49.

The pulsed output singal on the line 33 from the frequency to voltage converter 27 is an input to the low speed switch 56. The signal is applied through a resistor 109 connected to the non-inverting input 79-2 of the amplifier 79. A capacitor 111 is connected between the input 79-2 and the ground line 63 to filter the input signal at a D.C. voltage level. A pair of resistors 112 and 113 are connected in series as a voltage divider between the power line 72 and the ground line 63 to generate a low speed reference voltage signal proportional to the road speed below which the speed control circuit disengages from automatic control. The inverting input 79-1 is connected to the junction of the resistors 112 and 113 to receive the reference voltage signal. A resistor 114 is connected between the power line 72 and the output 79-3 to provide a source of current to the load connected to the output 79-3. A resistor 115 is connected between the input 79-2 and the output 79-3 to feed back a portion of the output signal to provide positive feedback such that the ripple on the signal at the input 79-2 will not cause the amplifier to switch back and forth at the output 79-3 as the vehicle road speed approaches the low speed reference. When the vehicle road speed, represented by the magnitude of the signal at the input 79-2, is greater than the low speed reference, represented by the magnitude of the signal at the input 79-1, the amplifier 79 will generate a positive polarity output signal at the output 79-3 which is connected to the cathode of a diode 116. The diode 116 will block this signal from reaching the amplifier control 58. When the vehicle road speed is less than the low speed reference, the amplifier will generate a ground potentional signal at the output 79-3.

An anode of the diode 116 is connected to the line 57 which in turn is connected to a base of a NPN transistor 117. An emitter of the transistor 117 is connected to a base of a NPN transistor 118, which functions as a switch between the amplifier 52 and the ground line 63 to halt the automatic control of the throttle when the vehicle road speed falls below the low speed reference which typically may represent 30 miles per hour. It also disables the resume switch 64 to prevent engagement below the low speed reference.

The amplifier 58 includes a biasing circuit for turning on the transistor 117 having a PNP transistor 119 with an emitter connected to the power line 72 and a collector connected to the ground line 63 through a resistor 121. A base of the transistor 119 is supplied with a bias voltage from a pair of resistors 122 and 123 connected in series between the base and the power line 72. The bias voltage is applied when the transistors 117 and 118 are turned on and turns on the transistor 119 for providing current flow through the transistor 119 and the resistor 121. A charging resistor 124 is connected in series with a capacitor 125 between the collector of the transistor 119 and the ground line 63. A pair of resistors 126 and 127 are connected in series between the junction of the resistor 124 and the capacitor 125 and the ground line 63 to complete the biasing circuit. The resistors 126 and 127 function as a voltage divider to provide a bias voltage to a base of the transistor 117 which is connected to the junction of the two resistors to turn on the transistor 117.

A collector of the transistor 117 is connected to the power line 72 through the resistor 123 and the emitter is connected to a base of the transistor 118 in a Darlington configuration. When the transistor 117 is turned on, current will flow through it to turn on the transistor 118. The transistor 118 has a collector connected to the line 61 and an emitter connected to the line 62. The line 62 is connected to the ground line 63 through the brake lights circuit 59. A pair of lamps 128 and 129, representing the typically parallel connected vehicle brake lights, are shown as providing a current path. However, since the lamps have a relatively low resistance, the current through the coil 92 and the transistor 91 of the amplifier 52 and the transistor 118 of the amplifier switch 58 is below the level required to light them.

When the vehicle road speed drops below the low speed reference, the base of the transistor 117 is connected to ground potential through the diode 116 to turn off the transistors 117 and 118 thereby disconnecting the emitter of the transistor 91 from the ground line 63. This turns off the amplifier 52 and releases the vehicle throttle from automatic control. The turning off of the transistors 117 and 118 removes the base bias voltage from the transistor 119 thereby turning it off. Since the transistor 119 is turned off, the capacitor 125 will discharge through the resistors to remove a source of base bias for the transistor 117 should the vehicle speed rise above the low speed reference value and the amplifier 79 generate a positive potential output signal. Thus the transistors 117 and 119 latch each other in the turned off state to keep the transistor 118 and the amplifier 52 turned off.

The transistors may be turned on by the momentary closing of the resume switch 64 by the vehicle operator if the vehicle road speed is greater than the low speed reference. This connects the power line 71 to the base of the transistor 117 through a current limiting resistor 131 to turn on the transistor 117 and to charge the capacitor 125 through the resistor 126. The turned on transistor 117 supplies base voltage to the transistor 119 to turn it on which in turn supplies base voltage to the transistor 117 to keep it and the transistor 118 turned on after the resume switch 64 has been opened.

Since the voltage across a capacitor cannot be changed instantaneously, the capacitor 125 provides a time delay to prevent a positive or negative voltage spike from turning on or off respectively the transistor 117. Such spikes may be generated by ignition noise or other electrical noise in the vehicle electrical system.

The normally open brake switch 65 is connected between the power line 71 and the line 62. When the switch 65 is closed by the application of the vehicle brakes, sufficient voltage will be applied to the brake lamps 128 and 129 to light them. This voltage also reverse biases the transistor 118 to turn it off thereby turning off the amplifier 52 and removing the throttle from automatic control. The turnning off of the transistor 118 also turns off the transistors 117 and 119 which latch and prevent the automatic control when the brake switch 65 is released. Automatic control can be resumed by actuating the set point swich 35 or the resume switch 64.

The throttle set up timer 31 functions as an anticipatory control generating a signal through the control comparator 24 and the amplifier 52 to the throttle control 25 to pre-position the throttle when it is sensed that vehicle operator has actuated the set point switch 35 of FIG. 2. The throttle set up timer 31 includes a NPN transistor 132 having a collector connected to the line 29 and an emitter connected to the line 63. A base is connected through a current limiting resistor 133 to the line 39. When the set point switch 35 is actuated, a positive polarity voltage will be applied to the line 39 to turn on the transistor 132. The capacitor 83 of the frequency to voltage converter 27, which has been charged to a voltage representing the vehicle road speed, is discharged through the transistor 132 thereby reducing the magnitude of the signal at the input 85-1 of the control comparator amplifier 85. The control comparator 24 and the amplifer 52 will then generate a continuous current flow through the coil 92 to advance the throttle. The signal on the line 39 is removed when the binary counter has been set to the count representing the desired road speed so that the control comparator can respond to the vehicle road speed. Since the throttle control 25 has been pre-positioned by the throttle set up timer 31, less time is required to advance the throttle control to maintain the desired road speed once it has been established in the binary counter 22.

Referring to FIG. 4, there is shown the set point limit circuit 34 of FIG. 2. The normally closed set point limit switch 35 is connected between the power line 71 and the one end of a current limiting resistor 134. The other end of the resistor 134 is connected to the junction of a pair of resistors 135 and 136 and a base of a NPN transistor 137. The resistors 135 and 136 are connected in series between a collector of a PNP transistor 138 and the ground line 63 to function as a voltage divider providing a bias voltage to the base of the transistor 137.

An emitter of the transistor 138 is connected to the power line 72. A resistor 139 is connected between the emitter and the base and a capacitor 141 is connected between the base and the collector to provide a bias voltage. Before the switch 35 is actuated, the capacitor 141 will be fully charged to turn off the transistor 138.

A collector of the transistor 137 is connected to a base of a NPN transistor 142 and an emitter of both transistors is connected to the ground line 63. A resistor 143 is connected between the base of the transistor 142 and the ground line 63. The base of the transistor 142 is also connected to the line 33 through a series of connected resistor 144 and capacitor 145. A collector of the transistor 142 is connected to the line 37.

The set point limit circuit 34 is completed by a resistor 146 connected between an anode of a diode 147 and the junction of the base of the transistor 138, the resistor 139 and the capacitor 141. A cathode of the diode 147 is connected to an anode of a diode 148 which has a cathode connected to the junction of the collector of the transistor 142 and the line 37.

Since the capacitor 141 is charged and the transistor 138 is turned off, there is no current flow through the resistor 135. The resistors 134 and 136 function as a voltage divider to generate a bias voltage at the base of the transistor 137 to turn it on. The base of the transistor 142 is connected to the ground line 63 through the turned on transistor 137 to turn off the transistor 142. If it is assumed, as will be shown, that the line 36 connected to the junction of the diodes 147 and 148 is at or near the regulated voltage potential, then the signal on the line 37 to the reset trigger will also be at or near the regulated voltage potential.

When it is desired to set the speed control at the present road speed, the set point switch 35 is momentarily opened by the vehicle operator to remove the unregulated voltage from the set point limit circuit 34. The set point switch 35 is also connected to the resume switch 64 to actuate it thereby turning on the amplifier 52. The voltage potentional at the junction of the resistor 135, the collector of the transistor 138 and the capacitor 141 will remain near ground potential to keep the transistor 138 turned off. The voltage potential at the junction of the resistors 134, 135 and 136 and the base of the transistor 137 is also at ground potential to turn off the transistor 137. When the leading edge of the first speed pulse to occur after the transistor 137 turns off occurs on the line 33, it will be differentiated by the capacitor 145 and will pass through the resistor 144 to the base of the transistor 142 to turn it on. The line 37 will then be connected to the ground line 63 through the transistor 142 to generate a reset signal to the reset trigger and turn on the transistor 138.

When the set point switch 35 is released by the vehicle operator, it closes to apply the unregulated voltage to the base of the transistor 137 to turn it on and to turn off the transistor 142. This prevents the generation of another reset signal on the line 37 by the occurrence of another road speed pulse of the line 33. If the operator holds the switch 35 open, the transistor 138 will prevent the generation of another reset signal by the occurrence of a subsequent speed pulse on the line 33 until a predetermined length of time has elapsed. The transistor 138 supplies current through the resistors 135 and 136 to bais the base of the transistor 137 to turn it on. This turns off the transistor 142 and prevents the generation of another reset signal on the line 37. However, after a predetermined time delay, the capacitor will have charged to a potential at the base of the transistor 138 to turn it off which turns off the transistor 137 and allows the transistor 142 to be turned on by a speed pulse on the line 33. Typically, this time delay may be approximately 1.5 seconds to allow the vehicle operator ample time to actuate and release the set point switch 35.

The set point latch 38 includes a pair of amplifiers 149 and 151 which are cross-coupled to function as a latching flip flop. A pair of resistors 152 and 153 are connected in series between the power line 72 and the ground line 63 to function as a voltage divider. A pair of non-inverting inputs 149-2 and 151-2 of the amplifiers 149 and 151 respectively are connected to the junctions of the resistors 152 and 153 to provide a positive potential or high input signal typically, one half of the power line 72 potential. An inverting input 149-1 is connected to receive a signal from an output 151-3 and an inverting input 151-1 is connected to receive a signal from an output 149-3. A resistor 154 is connected between the power line 72 and the line 39 to provide a source of current to the oscillator 21.

If the flip flop has been reset by a grounding of the input 151-1 on the line 47 from the speed comparator 46, a high signal at or near the regulated voltage potential will be generated at the output 151-3 of the amplifier 151 and will be applied to the line 36 as was previously assumed. The output 149-3 of the amplifier 149 will be low at or near ground potential since the input 149-1 is at a higher potential than the input 149-2. This low signal is applied at the input 151-1 to maintain the latch in its reset state. When the transistor 142 of the set point limit circuit 34 turns on, the line 36 will go low to place a low signal at the input 149-1. The amplifier 149 will change its output signal to high which is applied to the input 151-1. Since the input 151-1 is at a higher potential than the input 151-2 the amplifier 151 will change its output signal to low to maintain the latch in its set state.

The oscillator 21 includes a pair of NPN transistors 156 and 157 each having a base coupled through a capacitor to a collector of the other transistor. The transistor 156 has a collector connected to the power line 72 through a resistor 158 and coupled to a base of the transistor through a capacitor 159 connected to the anode of a diode 161 having a cathode connected to the anode of a diode 162 having a cathode connected to the base. The base of the transistor 156 is connected to a cathode of a diode 163 which has an anode connected to the power line 72 through a resistor 164. The transistor 156 also has an emitter connected to the ground line 63.

The transistor 157 has a collector connected to the power line 72 through a resistor 165 and connected through a capacitor 166 to the junction of the diode 163 and the resistor 164. A resistor 167 is connected between the power line 72 and the junction of the capacitor 159 and the diode 161. An anode of an isolation diode 168 is also connected to this junction and a cathode of the diode 168 is connected to the line 39. The voltage at the collector of the transistor 157 is the output signal from the oscillator 21 on the line 43.

The diode 168 is reverse biased by a positive polarity voltage from the set point latch 38 when it is in the set state to turn on the oscillator and is forward biased when the set point latch is in the reset state to place the line 39 at ground potential to turn off the oscillator. If line 39 is at ground potential, the base of the transistor 157 will be at or near ground potential to turn off the transistor 157. This places the power line potential on the line 43 and holds the capacitor 166 in its charged state since one of its terminals is at or near the power line potential and the other terminal is connected to the ground line 63 through the diode 163 and the base-emitter junction of of the transistor 156. The transistor 156 will be turned on since its base is connected to the power line potential through the resistor 164 to connect the capacitor 159 to the ground line. This holds the capacitor 159 in its discharged state since both of its terminals are at or near ground potential. Thus the oscillator 21 is in a stable state wherein it generates a continuous positive polarity signal on the line 43.

When the set point latch is set by the signal from the set point limit circuit 34 on the line 36, the diode 168 is reverse biased and the voltage at the base of the transistor 157 rises toward the power line potential as the capacitor 159 charges through the resistor 167 to turn on the transistor 157. This connects the capacitor 166 to ground and since the voltage across a capacitor cannot change instantaneously, the voltage at the junction of the resistor 164 and the diode 171 will fall below ground potential to turn off the transistor 156. The turning on of the transistor 157 also connects the line 43 to ground to generate a ground potential pulse. When the transistor 156 turns off, the capacitor 166 charges through the resistor 164 toward the power line potential to turn on the transistor 156, While the transistor 156 was turned off, the capacitor 159 charged through the resistor 158. When the transistor 156 turns on, the capacitor 159 is connected to ground and the voltage at the junction of the resistor 167 and the diode 176 will fall below ground potential to turn off the transistor 157 and place a positive polarity pulse on the line 43. Now the capacitor 159 will begin charging through the resistor 167 to start the cycle over. The frequency and the duty cycle of the pulse train may be determined by the selection of values for the capacitors and charging resistors.

The alternating positive polarity and ground potential pulses generated by the oscillator on the line 43 are applied to an input 169-1 of a seven stage binary counter 169 of the binary counter 22. The counter 169 accumulates a binary count representing the total number of signal pulses received which is proportional to the desired road speed. The count is displayed on a plurality of output lines 169-2 (representing binary "one") through 169-8 (representing binary "64") respectively and is incremented on the negative going transistion of each positive polarity pulse. The counter memory and the outputs may be set to zero by a positive polarity pulse at the reset input 169-9 which is connected to the line 42. A capacitor 171 is connected between the input 169-1 and the ground line 63.

The outputs 169-2 through 169-8 are connected to a plurality of input lines 172-2 through 172-8 respectively of a digital to analog converter 172 of the converter 23. The binary number is converted to an analog voltage at the output 172-1 and is sent through a current limiting resistor 173 on the line 45 to the speed comparator 46 and the buffer 48.

The buffer 48 includes an amplifier 174 having a non-inverting input 174-2 connected to the line 45. An inverting input 174-1 is connected to an output 174-3 which is also connected to the line 49. A resistor 175 is connected between the power line 72 and the output 174-3 to provide a source of current. A filter capacitor 176 is connected between the output 174-3 and the ground line 63. The buffer 48 has a high input impedance so as not to load the output from the converter 23 and has a low output impedance to provide power to the control comparator 24.

The speed comparator 46 includes an amplifier 177 having an inverting input 177-1 connected to the line 45 for receiving the desired road speed signal. A non-inverting input 177-2 is connected to a tap of an adjustable resistor 178. One end of the resistor 178 is connected through a resistor 179 to the ground line 63 and the other end is connected through a current limiting resistor 181 to the line 33. A capacitor 182 is connected between the junction of the resistors 178 and 181 and the ground line 63 and is charged to the average magnitude of the vehicle road speed signal on the line 33. The adjustable resistor may be utilized to scale the vehicle road speed signal to the desired road speed signal.

The signal from the converter 23 is a series of voltage steps of increasing magnitude as the counter 22 accumulates the pulses from the oscillator. The amplifier generates a positive polarity signal at an output 177-3 to reverse bias a diode 183 having a cathode connected to the output 177-3 and an anode connected to the line 47. When the desired road speed signal equals the vehicle road speed signal, the amplifier output will drop to ground potential which is applied to the input 151-1 of the amplifier 151 to reset the set point latch 38 and turn off the oscillator 21. A resistor 184 is connected between the power line 72 and the output 177-3 to provide a source of current.

As was previously stated, the oscillator is triggered by the leading edge of the first vehicle road speed pulse on the line 33 which occurs after the set point switch 35 is actuated. The capacitor 182 functions as a filter to produce a triangular waveform superimposed on the average magnitude of the vehicle road speed signal. The leading edge of the oscillator triggering vehicle road speed pulse also initiates the positive slope of the triangular waveform. As the output from the converter 172 increases, it will cross the positive slope at a predetermined point at which the desired road speed is equal to the vehicle road speed and the oscillator is stopped.

Since the two input signals to the amplifier 177 are synchronzied by the leading edge of the vehicle road speed pulse, the crossing point will be the same for a particular speed each time the set point switch 35 is actuated. Therefore, the present invention provides a highly accurate desired road speed signal for controlling the vehicle road speed.

The reset trigger 41 includes a PNP transistor 185 having an emitter connected to the power line 72 and a collector connected to the ground line 63 through a a resistor 186. A base of the transistor 185 is connected to the power line 72 through a resistor 187 to turn the transistor 185 off. The line 42 is connected to the collector of the transistor 185 to place the reset input 169-9 of the counter 169 at ground potential. The line 37 is connected to the base of the transistor 185 through a capacitor 188 and a resistor 189. The capacitor 188 is discharged since both of its terminals are at or near the power line potential.

When the actuation of the set point switch 35 turns on the transistor 142 of the set point limit circuit 34, the voltage on the line 37 will fall near ground potential. Since the voltage across a cpacitor cannot change instantanaeously, the voltage at the base of the transistor 185 will fall turning on the transistor and the capacitor 188 will charge through the emitter-base junction. The reset input 169-9 will be connected to the power line 72 to reset the counter 169 to zero before the count representing the desired road speed is accumulated.

In summary, the present invention relates to a vehicle speed control circuit for automatically controlling the road speed of a vehicle. A speed sensor 26 detects the rotation of an element of the vehicle and generates a pulsed output signal having a frequency proportional to the vehicle road speed. A frequency to voltage converter 27 converts the pulsed signal to a waveform having a D.C. voltage base with a magnitude proportional to the vehicle road speed capped by a triangular waveform with a frequency proportional to and an amplitude inversely proportional to the vehicle road speed. This waveform is applied to one input of a control comparator 24 through a throttle set up timer 31. The other input to the control comparator 24 receives a D.C. voltage signal having a magnitude proportional to the desired road speed. The control comparator 24 generates a duty cycle modulated control signal having a duty cycle proportional to the difference between the two input signals. An amplifier 52 and throttle control 25 respond to the control signal to adjust the vehicle throttle so as to maintain the desired road speed.

Automatic speed control is initiated by the actuation of a set point switch 35 when the vehicle reaches the desired road speed. The speed control circuit responds to the first vehicle road speed pulse to occur after the set point switch has been actuated. The throttle set up timer 31 signals the control comparator 24 to generate a control signal which will pre-position the throttle control 25. At the same time, a binary counter 22 is reset and begins counting pulses from an oscillator 21 which has been actuated. A digital to analog converter 23 generates a D.C. voltage signal having a magnitude proportional to the total number of pulses counted in the time elapsed since the first pulse occurred. The first pulse also generates a signal having a positive slope which has a magnitude proportional to the vehicle road speed and the time elapsed from the occurrence of the first pulse. The two signals are compared by a speed comparator 46 which turns off the oscillator 21 and the throttle set up timer 31 when the magnitudes of the signals are equal. Since the generation of the two input signals to the speed comparator is initiated by the first vehicle speed pulse to occur after the set point switch has been actuated, the waveforms are synchronized at any speed to generate a highly accurate desired road speed signal with a high degree of repeatability. Now the total count in the binary counter is stored and the output signal from the digital to analog converter 34 represents the desired road speed. This signal is applied to the control comparator 24 through a buffer 48.

The control circuit includes a low speed switch 56 which detects a vehicle road speed below a predetermined value, typically 30 miles per hour, and turns off the amplifier 52 through an amplifier control 58 which breaks a circuit to ground through a brake lights circuit 59. The circuit may also be broken by the actuataion of a brake switch 65. The amplifier lockout control latches open and will only make the ground circuit to turn on the amplifier and resume control at the desired road speed if a resume switch 64 is actuated when the vehicle speed is above the low speed value. The resume switch 64 is also actuated when the set point switch 35 is actuated to set a new desired speed.

In accordance with the provisions of the present statutes, I have explained the principle and mode of operation of my invention and have illustrated and described what I now consider to represent its best embodiment. However, I desire to have it understood that the invention may be practiced otherwise than as specifically illustrated and described without departing from its spirit or scope.

What I claim is:

1. In a vehicle having a source of a pulsed vehicle road speed signal of a frequency proportional to the vehicle road speed and a throttle control means, a speed control circuit for automatically maintaining the speed of the vehicle at a desired road speed, comprising:

means actuated by the vehicle operator when the vehicle reaches the desired road speed and responsive to the first vehicle road speed signal pulse to occur after said actuation for generating a first signal having a magnitude which is a function of the time elapsed from the occurrence of said first pulse;

means responsive to said first pulse generating a second signal having a magnitude which is a different function of the time elapsed from the occurence of said first pulse;

means for comparing the magnitudes of said first and second signals and for terminating the generation of said first signal when said magnitudes coincide wherein said means for generating said first signal stores said first signal as the desired road speed signal; and comparator and control signal generating means responsive to the vehicle road speed signal and said desired road speed signal for generating a control signal to have the throttle control means to maintain the speed of the vehicle at the desired road speed.

2. A speed control circuit according to claim 1 wherein said means for generating a first signal includes an oscillator for generataing a relatively high frequency pulse train; a binary counter for counting the pulses of said pulse train and for generating a binary coded output signal representing the accumulated total pulse count; and a digital to analog converter for continuously converting said binary coded output signal into said first signal having a magnitude proportional to the accumulated total pulse count.

3. A speed control circuit according to claim 1 wherein said means for generating a second signal includes a capacitor connected to the pulsed vehicle road speed signal source and responsive to said pulses for generating said second signal as a D.C. voltage having a magnitude proportional to the vehicle road speed capped by a triangular waveform having each positive slope initiated at the leading edge of one of said pulses.

4. In a vehicle having a source of a pulsed vehicle road speed signal of a frequency proportional to the vehicle road speed and a throttle control means, a speed control circuit for automatically maintaining the speed of the vehicle at a desired road speed, comprising:
   a set point means actuated by the vehicle operator when the vehicle reaches the desired road speed and responsive to the first vehicle road speed signal pulse to occur after said actuation for generating a set signal;
   means responsive to said set signal for generating a first signal having a magnitude which is a function of the time elapsed from the occurrence of said first pulse;
   means responsive to said first pulse for generating a second signal having a magnitude which is a different function of the time elapsed from the occurrence of said first pulse;
   means for comparing the magnitudes of said first and second signals and for generating a reset signal when the magnitudes coincide wherein said means for generating said first signal is responsive to said reset signal to terminate the generation of said first signal and includes means to store said first signal as the desired road speed signal; and
   comparator and control signal generating means responsive to the vehicle road speed signal and said desired road speed signal for generating a duty cycle modulated control signal to the throttle control means to maintain the speed of the vehicle at the desired road speed.

5. A speed control circuit according to claim 4 wherein said set point means includes a set point switch; means responsive to the actuation of said set point switch and to the first vehicle road speed signal pulse to occur after said actuation for generating said set signal; and means responsive to said set signal for inhibiting said means for generating said set signal from responding to a subsequent vehicle road speed pulse.

6. A speed control circuit according to claim 5 wherein said means for inhibiting inhibits said means for generating said set point signal during a predetermined time delay.

7. A speed control circuit according to claim 4 wherein said means for generating said first signal includes a set point latch responsive to said set signal for generating an output signal, pulse generating means responsive to said output signal for generating a train of pulses at a relatively high frequency and means for continuously converting a binary coded signal into said first signal with a magnitude proportional to an accumulated total pulse count and wherein said means to store is a counter for counting the pulses of said pulse train and for continuously generating said binary coded signal representing the accumulated total pulse count.

8. A speed control circuit according to claim 7 wherein said set point latch is responsive to said reset signal for removing said set point latch output signal from said pulse generating means.

9. A speed control circuit according to claim 4 including an anticipatory control means responsive to said set signal for removing the vehicle road speed from said comparator and control signal means to drive said control signal to a 100 percent duty cycle to pre-position the throttle of the vehicle.

10. In a vehicle having a source of a vehicle road speed signal and a throttle control means, a speed control circuit for automatically maintaining the speed of the vehicle at a desired road speed, comprising:
    means actuated by the vehicle operator when the vehicle reaches the desired road speed for generating a desired road speed signal;
    comparator and control signal generating means responsive to the vehicle road speed signal and said desired road speed signal for generating a duty cycle modulated control signal to the throttle control means to maintain the speed of the vehicle at the desired road speed; and
    anticipatory control means responsive to said actuation of said means for generating a desired road speed signal for removing the vehicle road speed signal from an input of said comparator and control signal means to drive said control signal to a 100 percent duty cycle to pre-position the throttle of the vehicle.

11. A speed control circuit according to claim 10 wherein said means for generating a desired road speed signal includes means for generating an output signal having a magnitude which is a function of the time elapsed from the actuation of said anticipatory control means; comparator means responsive to said output signal and the vehicle road speed signal for generating a reset signal when the magnitudes are equal and wherein said anticipatory control means is responsive to said reset signal to replace the vehicle road speed signal at said input of said comparator and control signal means.

\* \* \* \* \*

UNITED STATES PATENT OFFICE
CERTIFICATE OF CORRECTION

Patent No. 3,952,829  Dated April 27, 1976

Inventor(s) Larry O. Gray

It is certified that error appears in the above-identified patent and that said Letters Patent are hereby corrected as shown below:

| | | |
|---|---|---|
| Column 3 | line 54 | after "including a" insert - - speed - - . |
| Column 5 | line 29 | change "outputs" to - - inputs - - . |
| Column 9 | line 2 | change "siignal" to - - signal - - . |
| Column 12 | line 52 | change "swich" to - - switch - - . |
| Column 15 | line 53 | change "156 ," to - - 156 . - - . |
| Column 16 | line 16 | change "the" to - - an - - . |
| Column 17 | line 23 | change "cpacitor" to - - capacitor - - . |

Signed and Sealed this

Fourteenth Day of December 1976

[SEAL]

Attest:

RUTH C. MASON
*Attesting Officer*

C. MARSHALL DANN
*Commissioner of Patents and Trademarks*